United States Patent
Ng et al.

(10) Patent No.: US 9,903,961 B1
(45) Date of Patent: Feb. 27, 2018

(54) PHOTODETECTOR ARRAY READOUT MULTIPLEXER HAVING SUMMING, PULSE SHAPING, AND DYNAMIC-SWITCHING CIRCUITS

(71) Applicant: FMI Medical Systems Co., Ltd., Zhejiang (CN)

(72) Inventors: Johnny S. Ng, Kettering, OH (US); Piyush J. Shah, Beavercreek, OH (US); Xiaoxu Niu, Centerville, OH (US)

(73) Assignee: FMI Medical Systems Co., Ltd., Zhejiang (CN)

( * ) Notice: Subject to any disclaimer, the term of this patent is extended or adjusted under 35 U.S.C. 154(b) by 0 days.

(21) Appl. No.: 15/254,511

(22) Filed: Sep. 1, 2016

(51) Int. Cl.
*G01T 1/29* (2006.01)
*G01T 1/161* (2006.01)

(52) U.S. Cl.
CPC ............ *G01T 1/2985* (2013.01); *G01T 1/161* (2013.01)

(58) Field of Classification Search
CPC ......... G01T 1/249; G01T 1/20; G01T 1/2018; G01T 1/2985; A61B 6/037; A61B 6/4258
See application file for complete search history.

(56) References Cited

U.S. PATENT DOCUMENTS

| | | | | |
|---|---|---|---|---|
| 4,672,207 A | * | 6/1987 | Derenzo | G01T 1/1644 250/363.02 |
| 4,675,526 A | * | 6/1987 | Rogers | G01T 1/1642 250/363.02 |
| 5,144,141 A | * | 9/1992 | Rougeot | G01T 1/2018 250/366 |
| 5,504,334 A | * | 4/1996 | Jansen | G01T 1/1642 250/366 |
| 5,912,578 A | | 6/1999 | Bird | |
| 6,639,220 B2 | * | 10/2003 | Stark | A61B 6/04 250/363.02 |
| 6,740,859 B1 | * | 5/2004 | Wojcik | H01J 43/28 250/214 A |
| 8,467,644 B1 | * | 6/2013 | Kim | G01T 1/2018 362/610 |
| 8,822,931 B2 | | 9/2014 | Laurence et al. | |
| 9,176,240 B2 | * | 11/2015 | Gagnon | G01T 1/208 |
| 9,599,731 B2 | * | 3/2017 | Schulz | G01T 1/2985 |
| 2013/0299710 A1 | * | 11/2013 | Uchida | G01T 1/2006 250/366 |
| 2014/0299777 A1 | | 10/2014 | Oleinik et al. | |

* cited by examiner

*Primary Examiner* — Marcus Taningco
(74) *Attorney, Agent, or Firm* — Fishman Stewart PLLC

(57) ABSTRACT

A photodetector array readout and dynamic multiplexing method for reducing the overall channel count in a PET scanner system is disclosed. A PET system includes detector modules mounted on a ring-shaped gantry, each module including an array of M×N pixelated scintillators with photosensors attached to each pixelated scintillator on at least one of the top and the bottom surfaces. The multiplexer includes row and column summing, pulse shaping, and dynamic switching circuits multiplexing M×N inputs to a single output representing the energy and timing of the detected radiation. A position encoder is configured to receive outputs from the N+M summing circuits, and determine which pixelated scintillator had a gamma ray interaction. When photosensors are attached on both surfaces, the depth of interaction is determined as well based on the relative strength of the top and bottom surface readouts.

21 Claims, 8 Drawing Sheets

PHOTODETECTOR ARRAY READOUT MULTIPLEXER HAVING SUMMING, PULSE SHAPING, AND DYNAMIC-SWITCHING CIRCUITS

TECHNICAL FIELD

This disclosure relates generally to diagnostic imaging and, more particularly, to an apparatus and method of reducing overall channel count in positron emission tomography (PET).

BACKGROUND

PET is a functional imaging technique in nuclear medicine that produces a three-dimensional image of functional processes in a living subject. Typically, a short-lived radioactive tracer isotope, such as fluorodeoxyglucose (FDG), is injected into the subject, where it becomes concentrated in a tissue of interest. As the radioisotope undergoes positron emission decay (also known as beta decay), it emits a positron (an antiparticle of the electron and having an opposite charge). The positron travels for a distance that is typically less than 1 mm (dependent on the type of isotope), during which time it loses kinetic energy. Once sufficiently decelerated it can interact with an electron. The electron and positron annihilate, which produces a pair of annihilation photons that move in approximately opposite directions. A significant fraction of the electron-positron annihilations results in two gamma rays or photons at 511 keV, emitted at approximately 180° apart and along a straight line of response (LOR) to pixelated gamma ray detectors that are positioned around the subject. The two gamma rays are detected within a certain coincidence timing window. With an appropriate time-resolution of detected pairs of gamma rays, the time-of-flight may be determined for each coincident event, which may be used to determine the location of the annihilation event. In addition, energy information is important for rejecting scattered photon and other spurious signals outside of the 511 keV energy window. An image is generated based on the acquired energy and timing and hit-location data.

Statistics are obtained for many thousands of coincidence events. Typically, the coincidence events may be grouped into projection images, called sinograms. Known reconstruction techniques such as filtered back projection (FBP) may be used to reconstruct images from the projection images, resulting in a map that shows tissues in which the tracer has become concentrated, which can be interpreted by a physician or radiologist in the context of supporting a diagnosis or treatment for the subject.

PET is used for both medical and research applications. For instance, it may be used in clinical oncology to study tumors and search for metastases, or for clinical diagnosis of brain diseases. PET is also used to map brain and heart function, or to support drug development. PET is capable of detecting areas of molecular biology detail and may be used in a dedicated scanner.

Typically, such a scanner includes a patient table that provides for placement of the patient within the proper proximity of a bank of pixelated gamma ray detectors. Commonly, the bank of gamma ray detectors is positioned radially over 360° of the patient. The detectors convert the energy deposited by incident pairs of gamma rays to an optical signal, which are then converted to electrical signals and processed in a data acquisition system. The processed data is passed to a computing device for imaging reconstruction. The amount of information obtained for imaging may be based on factors that include system noise. Noise may be generated, in one example, in which scatter occurs within the subject (where photons are deflected). In another example, noise may be generated based on random events in which two photons originating from two different annihilation events are incorrectly attributed to the same event— thereby incorrectly recorded as a coincidence pair arriving within the timing window.

A PET system may include a dedicated PET scanner, or may be combined with other known imaging modalities such as computed tomography (CT) or magnetic resonance imaging (MRI). In combined systems, both metabolic and anatomic information may be co-registered to provide combined information about both structure and biochemical activity.

Traditional PET detectors typically include arrays that are segmented scintillator pixels, each with a cross-section of approximately 10 $mm^2$, in one example, coupled to photomultiplier tubes with couple centimeter diameters. Because of the mismatch in scintillator and photomultiplier sensitive areas, signal analysis methods such as "Anger logic" are commonly used to determine the gamma ray hit position. Anger logic is a procedure to obtain the position of incidence of a photon on the scintillator, which includes connecting photomultiplier outputs to a resistive network to obtain only four outputs. With these signals or outputs, the 2-dimensional position of the scintillation centroid is obtained using a simple geometric formula. However, the resulting spatial image typically shows large distortions and non-uniform energy resolution across the sensitive area.

Recent detector technology employs a photosensor called Silicon Photomultipliers (SiPM) that includes an array of avalanche photodiodes with total sensitive area matching the scintillator pixel. An avalanche photodiode (APD) is a highly sensitive semiconductor electronic device that exploits the photoelectric effect to convert light to electrical signal. A SiPM operates at high speeds and high gain by applying a reverse bias voltage (typically 100-200 V but in some cases as low as 26 to 30 V), and shows an internal current gain effect, a factor of one million in one example. The one-on-one SiPM-scintillator pixel coupling configuration provides excellent timing resolution and highly uniform energy resolution across the sensitive area. But because each pixel element covers a small area of a few $mm^2$, a whole-body PET scanner based on this technology involves many tens of thousands of detector channels.

The electronic readout of the large number of SiPM detector channels is handled either by application specific ICs (ASICs) or by some type of electronic channel-reduction circuits. In an alternative, frontend electronics based on discrete components mounted on conventional printed circuit boards (PCBs) can be used. Currently the general approach is to use a resistive (or capacitive) network to derive weighted sums of the detector elements, which can be used to determine a hit position of the gamma ray. The drawback is that the timing and energy resolutions are degraded due to the large (summed) detector capacitance and noise. Another approach employs delay-line switched network architecture together with a field-programmable gate array (FPGA) to readout only the hit pixel. This improves timing and energy resolutions, but the resulting boards can be bulky, power hungry and expensive to build.

Thus, there is a need to reduce overall electronic readout channel count in cost effective and high performance PET scanners.

SUMMARY

The disclosure is directed toward a method and apparatus of dynamically multiplexed readout of an array of photodetectors in a PET system. The multiplexer includes electrical circuits that sum signals in both column and row directions, and employs pulse shaping and dynamic switching to provide a single multiplexed output signal representing the energy and arrival time of the detected radiation. An algorithm implemented in the firmware of the position encoding processor determines which pixelated scintillator within the array had a gamma ray interact therewith based on the row and column sum outputs.

According to one aspect, a PET scanning system includes a gantry having an opening for receiving a subject to be scanned, and a detector ring positioned to receive gamma rays that emit from the subject, the detector ring comprising a plurality of detector modules. Each module includes an array of M×N pixelated scintillators, the array comprised of N rows of pixelated scintillators and M columns of pixelated scintillators that are approximately orthogonal to the N rows, the array having a top surface and a bottom surface, and individual photosensors attached to each pixelated scintillator on the top surface. The system includes a readout multiplexer comprising of N summing circuits that are each electrically connected to a respective row of M individual photosensors, M summing circuits that are each electrically connected to a respective column of N individual photosensors, and pulse shaping and dynamic switching circuits to reduce M×N inputs to a single output, which provides a measure of the energy and timing of the gamma ray. A position encoding processor is configured to receive outputs from the N+M summing circuits, and programmed to determine which pixelated scintillator within the array had a gamma ray interaction based on the outputs.

According to another aspect, a method of PET imaging therefore includes receiving output signals from N summing circuits that are each electrically connected to a first surface and a respective row of M photosensors each attached to a pixelated scintillator in an array of M×N pixelated scintillators, receiving output signals from M summing circuits that are each electrically connected to the first surface and a respective column of N pixels in the array, identifying which one of the rows has an increased signal as a result of a gamma ray interaction with one of the pixelated scintillators, and determining the energy and timing of the signal, based on the received output signals from the N summing circuits. The method further includes identifying which one of the columns has an increased signal as a result of the gamma ray interaction with the one of the pixelated scintillators, based on the received output signals from the M summing circuits, and determining which pixelated scintillator of the array had the gamma ray interaction based on the identified row and based on the identified column.

According to yet another aspect, a method of fabricating a PET detector includes providing an array of pixelated scintillators having a top surface and a bottom surface, the array including N rows of pixelated scintillators in a first direction and M columns of pixelated scintillators in a second direction that is approximately orthogonal with the first direction, attaching individual photosensors to each of the M×N pixelated scintillators on the top surface of the array, attaching N summing circuits to M photosensors on the top surface in each row of the pixelated scintillators, attaching M summing circuits to N photosensors on the top surface in each column of pixelated scintillators, configuring a position encoding processor to receive outputs from the N+M summing circuits, and programming the position encoding processor to determine which pixelated scintillator within the array had a gamma ray interaction based on the outputs. The method also includes providing a readout multiplexer to generate a single energy and timing signal based on M×N photosensor signals.

Various other features and advantages will be made apparent from the following detailed description and the drawings.

DETAILED DESCRIPTION

The operating environment of disclosed embodiments is described with respect to a positron emission tomography (PET) system.

Figure 1:
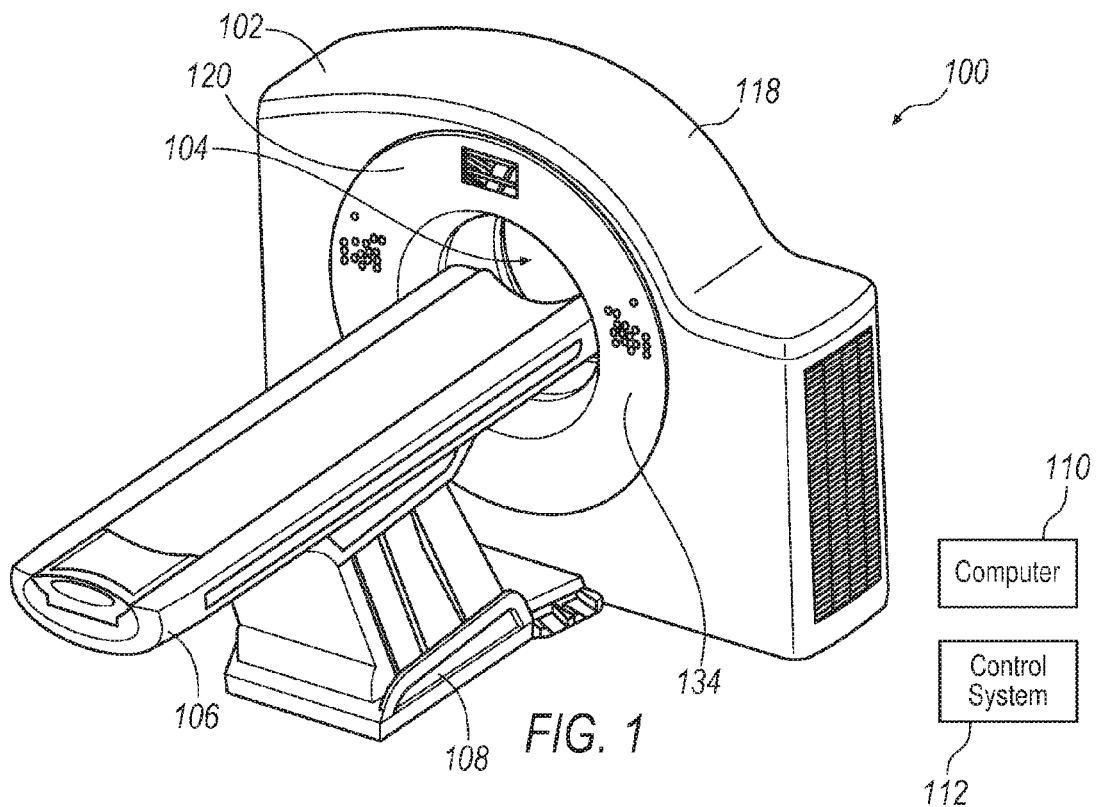
FIG. 1 is a perspective view of a PET imaging system.
Figure 2:
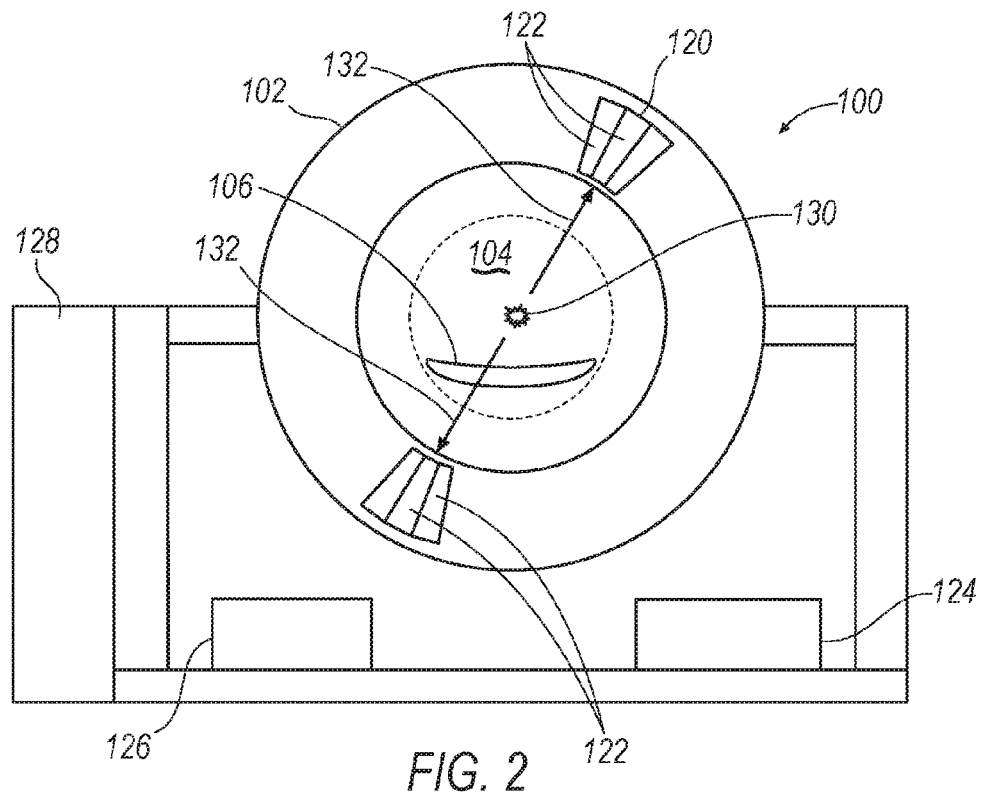
FIG. 2 is a planar cross-section of the system illustrated in FIG. 1.

Referring to FIGS. 1 and 2, a PET system 100 includes a gantry 102 having an opening 104. A patient table 106 is positioned on a support structure 108, and patient table 106 is axially controllable such that a patient (not shown) positioned on table 106 may be positioned within opening 104. A computer system or computing device 110 provides operator instructions and other control instructions to a control system 112. Computer system 110 also may include image reconstruction algorithms, or an image reconstructor may be provided as a separate processing unit. Control system 112 provides control commands for operating table 106. Gantry 102 includes a cover or enclosure 118, which provides for aesthetic improvement, safety, etc. System 100 includes a detector ring 120 of modules of gamma ray detectors 122, some of which are illustrated, which span the circumference of gantry 102. System 100 also includes data acquisition electronics 124, power supplies 126, and a control box 128.

In operation, a short-lived radioactive tracer isotope is injected into a patient (usually into blood circulation). The atoms of the tracer are chemically incorporated into a biologically active molecule. During a waiting period, the active molecules become concentrated in tissues of interest within the patient. In one example, a molecule commonly used is fluorodeoxyglucose (FDG), a sugar, for which the waiting period is typically an hour. Once concentrated in the tissue of interest, the patient is positioned on table 106 with the location of the concentration positioned within opening 104. During a scan, a record of tissue concentration is made as the tracer material decays.

That is, as the radioisotope undergoes positron emission decay (i.e., beta decay), it emits a positron, which is an antiparticle of the electron and having an opposite charge thereof. The positron travels a short distance within the tissue, typically less than 1 mm (dependent on the type of isotope), during which time it loses kinetic energy and can interact with an electron. The electron and positron annihilate 130, which produces a pair of annihilation photons 132 that move in approximately opposite directions. The annihilation photons 132, typically having 511 keV, are detected within gamma ray detectors 122 at approximately 180° apart.

For a coincidence event, two gamma photons 132 with measured energies around 511 keV are detected within a certain coincidence timing window. With an appropriate time-resolution of detected pairs of gamma rays, the time-of-flight may be determined for each coincident event, which may be used to determine the location of the annihilation event. Statistics are obtained for many thousands of coincidence events using data acquisition electronics 124. An image is generated based on the acquired coincidence data. Typically, the coincidence events may be grouped into projection images, called sinograms. Known reconstruction techniques such as filtered back projection (FBP) may be used to reconstruct images from the projection images using computer 110, resulting in a map that shows tissues in which the tracer has become concentrated, which can be interpreted by a physician or radiologist in the context of supporting a diagnosis or treatment for the subject. Gantry 102 may include gantry controls 134 located thereon, for convenient user operation of some of the commands for system 100.

Figure 3:
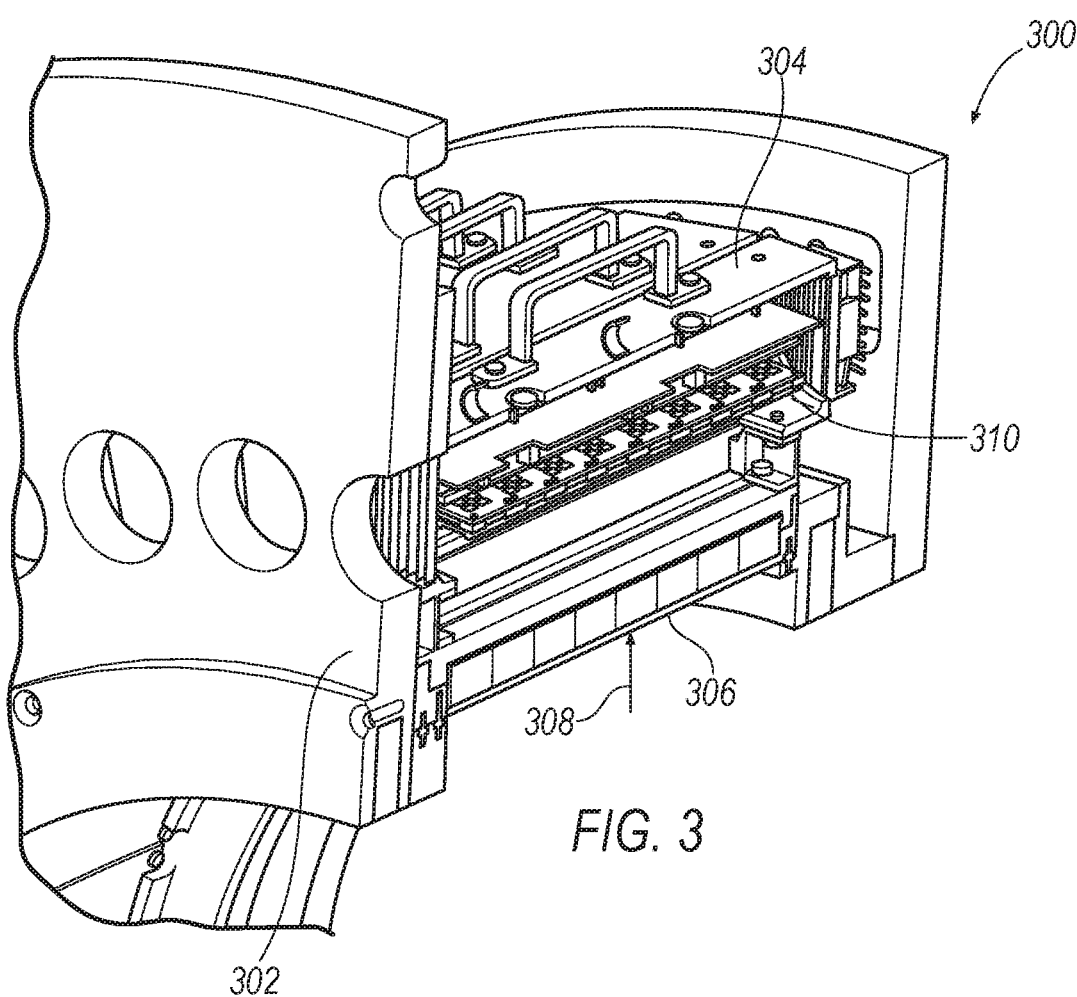
FIG. 3 is a perspective view of a portion of detector ring.

Referring to FIG. 3, a perspective view of a portion of detector ring 120 is illustrated as an assembly 300. Assembly 300 includes a gantry support plate 302 and a detector module housing 304. Gamma ray detectors 306 are positioned to receive, absorb, and detect gamma rays 308 which impinge thereupon, resulting from annihilation events, such as annihilation event 130. Front-end electronics 310 are positioned and configured to receive signals from gamma ray detectors 306. Front-end electronics 310 include a computing device or processor that calculates hit position based on signals received from gamma ray detectors 306. The data acquisition electronics 124 include a computing device or processor that calculates the energy and timing of the gamma ray based on signals received from the detector module.

Figure 4:
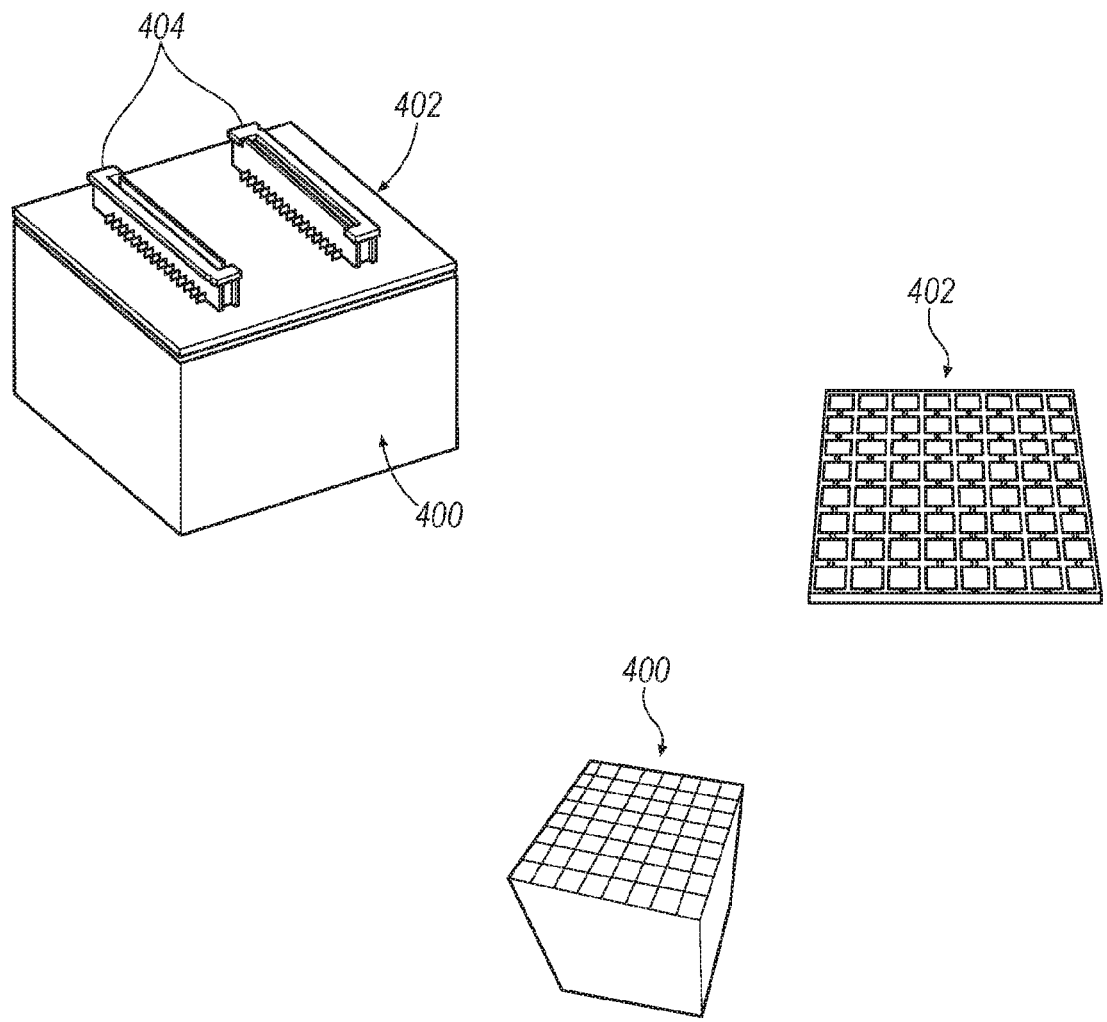
FIG. 4 is an example of a pixelated scintillator array and silicon photomultiplier array.

Referring to FIGS. 3 and 4, modules of gamma ray detectors 122 described include a pixelated scintillator material or scintillator crystal array 400 and a silicon photomultiplier (SiPM) array 402. The scintillator crystal array 400 scintillates (i.e., converts the absorbed energy into light) when a gamma ray photon collides therewith. Light output from the crystal array 400 is converted to an electrical signal in the SiPM array 402, to indicate the 2-dimensional location and total energy and timing of the gamma ray photon. The event information is passed through electrical connectors 404 to front-end electronics 310 of FIG. 3. The event information is further transmitted through a communication link, to include position, timing, energy, and other relevant information to computer 110.

Figure 5:
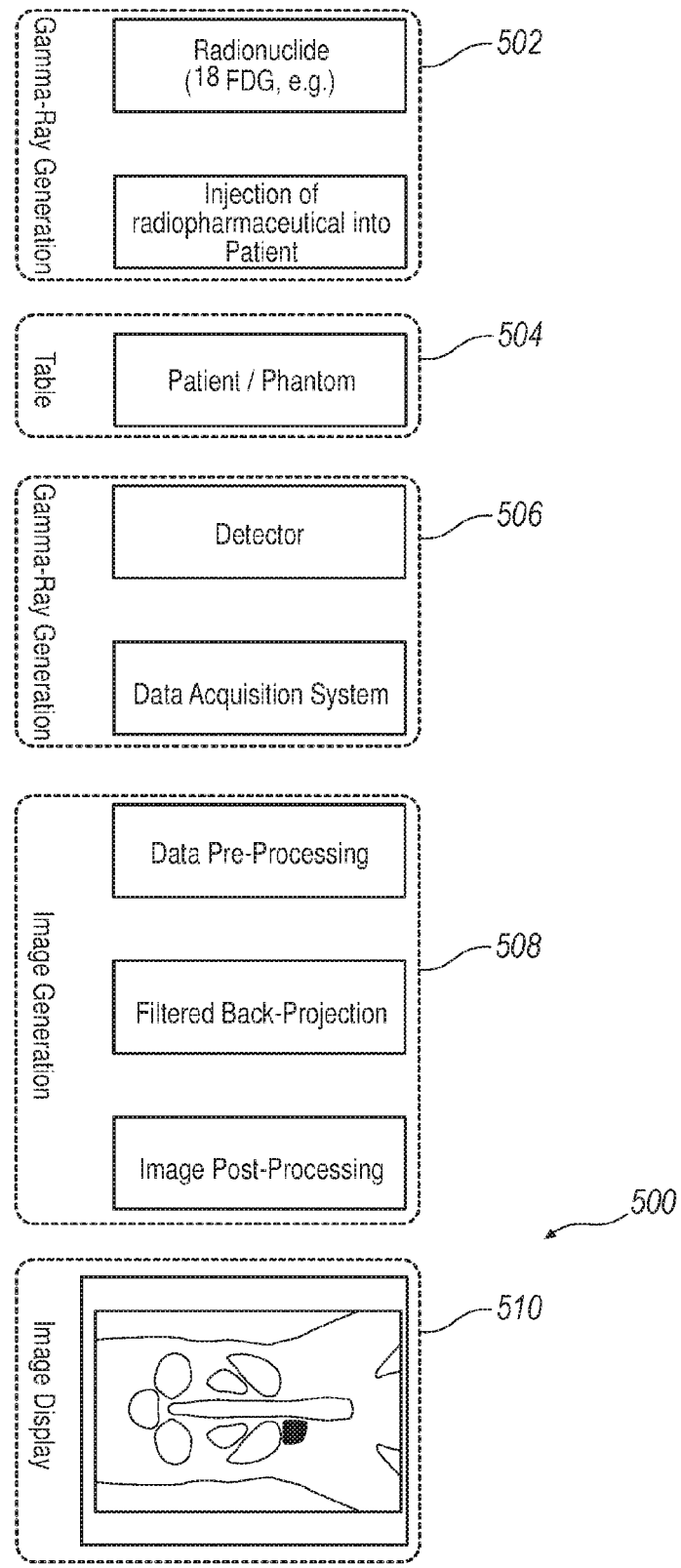
FIG. 5 is an exemplary image chain for a PET imaging system.

FIG. 5 illustrates an exemplary image chain 500, consistent with the operation described above. Gamma ray generation occurs 502, resulting from annihilation events that occur within a subject. Gamma ray generation 502 includes preparation of a radiopharmaceutical that includes a radionuclide such as FDG, and injection of the radiopharmaceutical into the subject. The radionuclide is absorbed by diseased tissues such as a tumor. The subject or patient (or a phantom if conducting calibration or other studies) is positioned on the table at step 504. Gamma ray detection occurs 506 by placement of the subject such that annihilation events occur in desired axial locations with respect to the detector ring, and data acquisition occurs. Image generation occurs in which data is pre-processed, reconstructed (using for example FBP), and image post-processing may be applied. The image is displayed at step 510.

Figure 6A:
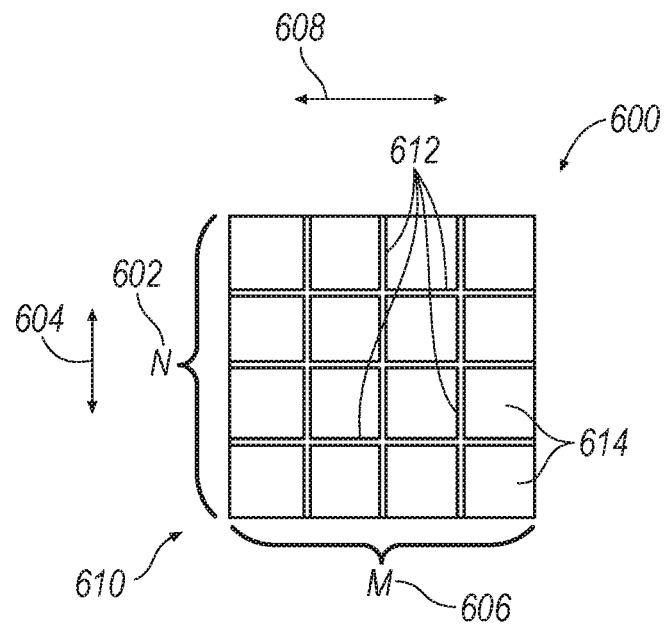
FIG. 6A illustrates a top view of a pixelated scintillator array.

According to the disclosure, channel reduction is achieved by using summing circuits to accumulate row and column signals from a subset of the scintillator pixels in an array. After pulse processing, dynamic switching circuit is used to obtain the final energy and timing signal from the row or column signals, thus avoiding summing up large detector capacitances from all photosensors. Further, row and column readout allows determination of the interaction coordinate of the detected gamma ray. The disclosed method and apparatus can be used for any combination of scintillator array and photosensors, its application not limited to the disclosed exemplary detector configurations. FIG. 6A illustrates a top view of a pixelated scintillator array 600. In the illustrated example, array 600 includes 4×4 pixels. The array 600 includes N rows 602 of pixelated scintillators in a first direction 604, and M columns 606 of pixelated scintillators in a second direction 608 that is orthogonal to first direction 604. In the illustrated example, M is equal to 4 and N is equal to 4, thus this example shows a symmetric arrangement for a total of M×N or 4×4=16 pixels formed in a square array. It is contemplated, however, that M need not equal N, and that therefore a rectangular array may also be applicable to the disclosure herein. It is also contemplated that more or less than 4 pixelated scintillators may be used in each direction of the array, and that as an example FIG. 4 shows an array of 8×8 that may be implemented according to the disclosure. Array 600 includes a first or top surface 610, shown in FIG. 6A, and a second or bottom surface opposite that of surface 610 (and not visible). Also, to reduce or eliminate crosstalk, the pixels include optically isolating or reflecting materials 612 between individual pixels 614.

Figure 6B:
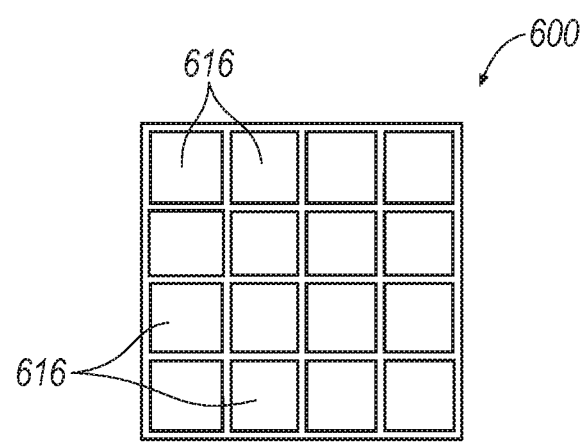
FIG. 6B illustrates the pixelated array of FIG. 6A having individual photosensors attached to each pixelated scintillator.

FIG. 6B illustrates pixelated array 600 having individual photosensors 616 attached to each pixelated scintillator 614 on the illustrated first surface 610. Thus, a total of M×N pixels is illustrated, each of which includes a respective photosensor 616. Each photosensor converts an optical signal, resulting from the gamma ray interaction with the pixelated scintillator, to an electrical signal.

Figure 6C:
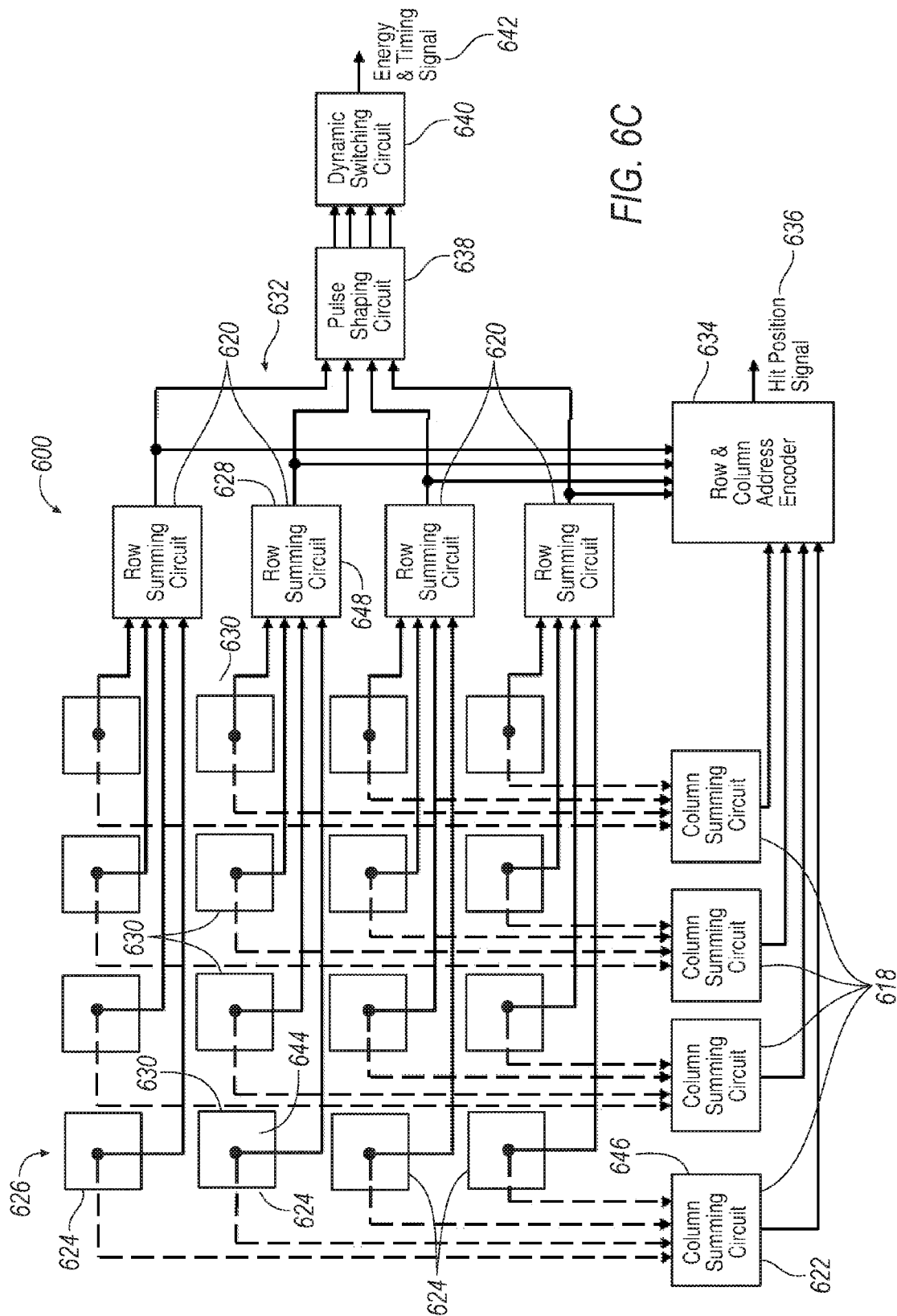
FIG. 6C illustrates the pixelated array of FIG. 6B having M×N pixels and respective M×N photosensors.

Referring now to FIG. 6C in the context of FIGS. 6A and 6B, pixelated array 600 having the M×N pixels 614 and the respective M×N photosensors 616. Includes column summing circuits 618 and row summing circuits 620. Each of the summing circuits may include a summing circuit that includes, for instance, an operational amplifier that may be used to sum signals in each of the N rows 602 and M columns 606. As can be seen, each of the column summing circuits 618 is coupled to the photosensors 616 in the respective column. Likewise, each of the row summing circuits 620 is coupled to photosensors 616 in the respective row. For instance, column summing circuit 622 is electrically connected to each photosensor 624 that is within one respective column 626 of pixels. As another example, row summing circuit 628 is electrically connected to each photosensor 630 within row 632 of pixels. Output of each of the column and row summing circuits 618, 620 may be sent to a row and column address encoder 634, which may encode and output the row and column address information as a hit position signal 636. A pulse shaping circuit 638 receives signals from all of the pixels via the row summing circuits 620, in this example, which may then output signals to a dynamic switching circuit 640, which generates a single energy and timing signal 642. The multiplexer circuit thus achieves an M×N-to-1 channel reduction ratio. Dynamic switching is achieved having a mechanism or circuit that includes a Schottky diode, as will be further described.

More generally, illustrated are summing circuits 618, 620 that are each electrically connected to respective columns and rows of individual photosensors. A processor, such as the processor described above in front-end electronics 310, includes address encoding circuit 634 and is thereby coupled to each of the summing circuits 618, 620. The processor is thereby configured to receive outputs from the summing circuits 620 and the summing circuits 618. The processor thereby determines which pixelated scintillator 614 within array 600 had a gamma ray interaction based on the outputs. In addition, the readout electronics includes pulse shaping circuit 638 and dynamic switching circuit 640, configured to provide a single output for energy and timing calculation in the data acquisition electronics 124.

Each of the row summing circuits 620 sums electrical signals from each row 602 having the M individual photosensors. Each of the column summing circuits sums electrical signals from each column 606 having the N individual photosensors. Thus, in operation, when a gamma ray interacts with a pixelated scintillator, one of the column summing circuits 618 outputs a first increased signal and one of the row summing circuits 620 outputs a second increased signal. For instance, in one example a pixel 644 receives a gamma ray which interacts with the scintillator therein. In this example, column summing circuit 646 would detect an increased signal or light output in column 626, and row summing circuit 648 would detect an increased signal or light output in row 632. Accordingly, by recognizing that column 626 and row 632 both include the increased signal, pixel 644 may thereby be ascertained as the pixel having received the gamma ray. As such, the position encoding processor identifies which row and column had the signal, and correlates between the identified row and the identified column to determine which pixelated scintillator had the gamma ray interaction. In addition, the dynamic switching circuit 640 would detect an increased signal in the row summing circuit 648 and correspondingly would generate a single output 642 representing the energy and timing of the detected gamma ray.

Figure 7:
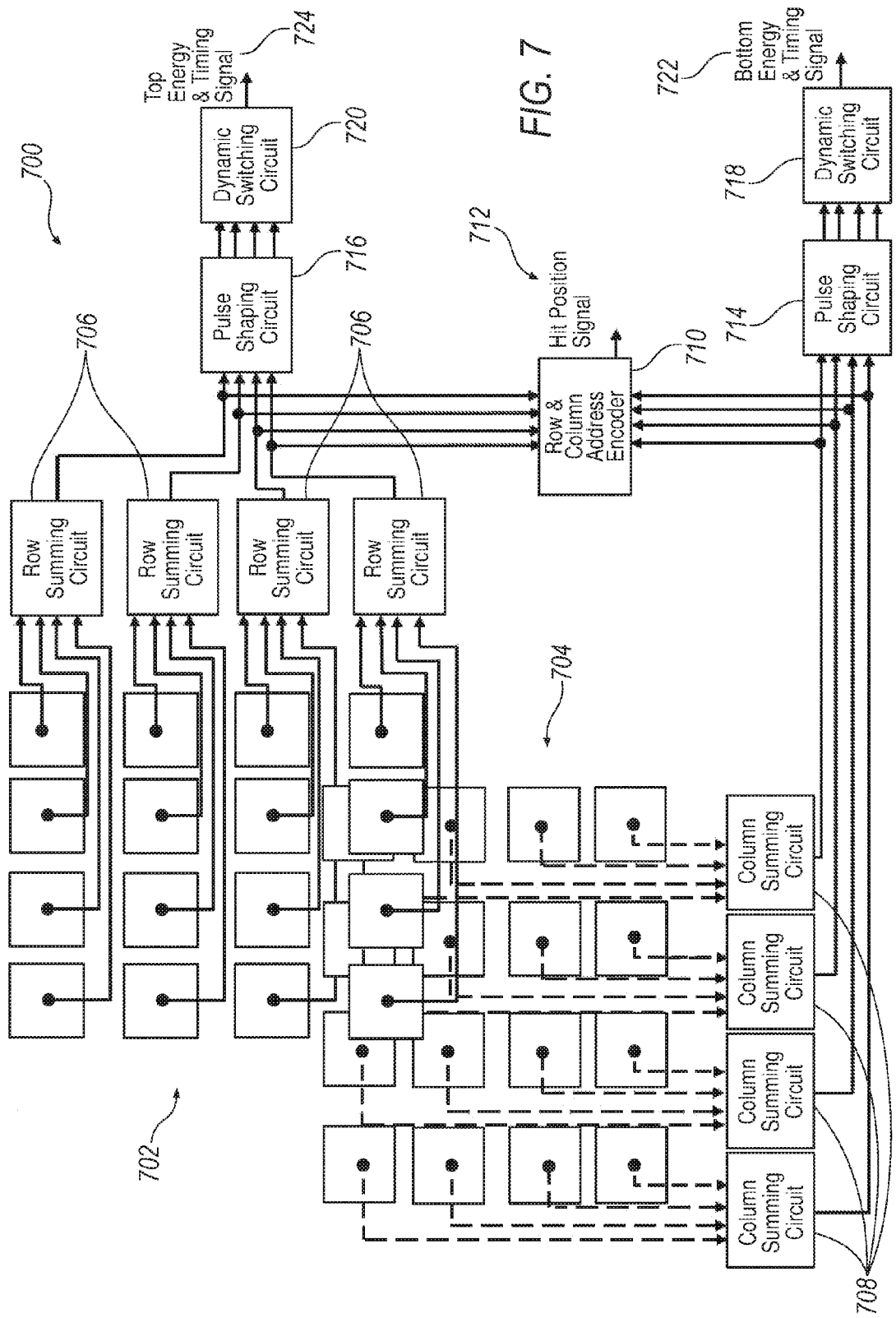
FIG. 7 illustrates photosensor arrays on top and bottom surfaces.

Referring now to FIG. 7, photosensor arrays on top and bottom surfaces provide not only the pixel in which the hit occurs, but the amplitude of the signal on top and bottom surfaces may be further used to determine a depth of interaction of the gamma ray with the scintillator, yielding yet additional information related to the energy of the gamma ray. As such, FIG. 7 includes an illustration 700 having a top array 702 of photosensors and a bottom array 704 of photosensors. In the example shown, top array 702 includes row summing sensors 706 and bottom array 704 includes column summing sensors 708. A row and column address encoder 710 provides a hit position signal 712, in the fashion as described with respect to FIG. 6C, except that the top and bottom information is used to determine hit position signal 712. Because the readouts are on both top and bottom of the array, pulse shaping circuits 714, 716 are included separately having one circuit 716 correspond to the top signals and the other circuit 714 correspond with the bottom signals. Dynamic switching circuits 718, 720 also correspond respectively to the bottom and top, as well. In addition and as stated, because of the readouts on both top and bottom of the pixelated array, the switching circuits 718, 720 also provide energy information 722, 724, respectively as well, which can provide the depth of interaction based on the relative strength of the signals 722, 724.

Figure 8:
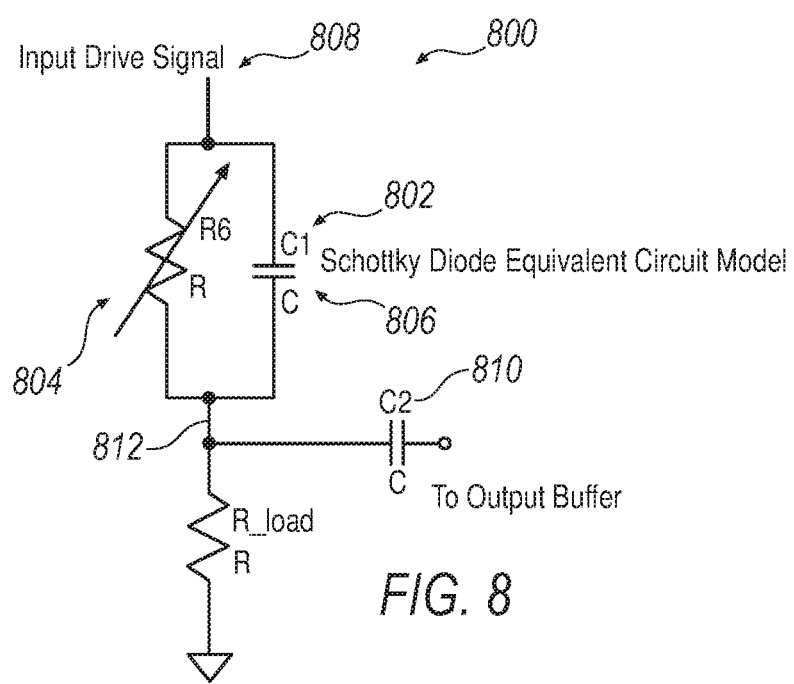
FIG. 8 illustrates a dynamic switching mechanism that may be implemented in the illustrated circuits.

FIG. 8 illustrates a dynamic switching mechanism 800 as described above. Dynamic switching is achieved having a mechanism or circuit that includes a Schottky diode, which as shown may be an equivalent circuit 802 with a variable resistor 804 in parallel with a capacitor 806 representing a junction capacitor of the diode. The value of variable resistor 804 may vary inversely proportional with the strength of the input drive signal 808. Thus, the variable resistor 804 and the load resistor (R_load) forms a voltage divider circuit, with capacitor 810 coupling signal pulse to the common output bus when the drive signal rises above a threshold pre-determined by the circuit bias condition. The presence of the signal pulse on the output bus raises the effective threshold (i.e., increases the reverse bias) on all other, non-firing, channels. Thus, the signal pulse itself dynamically suppresses the noise and dark pulses from non-firing channels.

Accordingly, advantages that result from this disclosure include one-to-one readout that eliminates spatial image distortion caused by "Anger-logic" type signal processing, and position-dependent energy resolution across the image plane. The disclosure also provides improved image quality and timing and energy resolution, but at a lower cost and with lower power consumption compared to a delay-line switched network approach. The disclosure also provides improved timing and energy resolution when compared to a resistive/capacitive network method. Other impacts of the disclosure on products such PET scanner include but are not limited to a simple design based on standard components that will lead to higher volume production yield and reduce time for quality control testing.

The disclosure results in reduced power consumption, which correspondingly reduces cooling requirement, which benefits the end user who will need to provide air-condition rooms to house the scanner.

The disclosed readout multiplexing scheme includes three stages as an integrated method:

Summing stage. The signals from rows (and separately the columns) of the photosensor array are summed together using an analogue electronic summing circuit, thus reducing a square M×N array (such as when M equals N) to a 2N number of channels. The row and column signals, used together with a comparator circuit, provide the encoded coordinates of the gamma-ray hit position.

Pulse shaping stage. The row signals may be further processed through a band-pass filter. A band-pass filter reduces noise and allows selection of high-frequency/fast-rising signal components. For BGO (bismuth germanate) crystals, typical rise times of the row-sum signals are approximately 90 ns, while shaped signals have rise times of approximately 45 ns. Thus, the pulse widths are also reduced to about 250 ns, which significantly improves the dead-time and pile-up performance of the data acquisition system.

Dynamic switching. This method employs a pair of Schottky diodes for each signal line with the diode driven to the on-state only when the signal is significantly above the noise floor. That is, the Schottky diode acts as a variable resistor with the value of its on-resistance ($R_{on}$) inversely proportional (nonlinearly) to the driving signal strength. $R_{on}$ forms a voltage divider network with the load resistor, effectively connecting the input channel onto a common bus line when the input signal is above a pre-determined noise threshold and disconnecting the input channel when the signal is below the noise threshold. The presence of the signal pulse on the output bus increases the reverse bias and dynamically suppresses the noise and dark pulses from non-firing channels. This step completes the multiplexed readout of M×N channels to a single output.

This mechanism is most effective for fast rising signals such as those coming from lutetium-based scintillators, for example, LYSO (Lutetium Yttrium Orthosilicate). Thus, even for relatively slow-decaying BGO crystals, the shaped fast-rising signals can also be effectively switched while preserving timing and energy resolutions. Furthermore, the disclosure can be used to readout any type of detector arrays yielding fast rising signal pulses.

Disclosed is a PET scanning system that includes a gantry having an opening for receiving a subject to be scanned, and a detector ring positioned to receive gamma rays that emit from the subject, the detector ring comprising a plurality of detector modules. Each module includes an array of M×N pixelated scintillators, the array comprised of N rows of pixelated scintillators and M columns of pixelated scintillators that are approximately orthogonal to the N rows, the array having a top surface and a bottom surface, and individual photosensors attached to each pixelated scintillator on one of the top and the bottom surfaces. The detector frontend electronics includes a readout multiplexer comprising of N summing circuits that are each electrically connected to a respective row of M individual photosensors on the one surface, M summing circuits that are each electrically connected to a respective column of N individual photosensors on the one surface, a pulse shaping and dynamic switching circuit, and a position encoding processor coupled to each of the summing circuits. The processor is configured to receive outputs from the N+M summing circuits, and programmed to determine which pixelated scintillator within the array had a gamma ray interaction based on the outputs. The multiplexer accepts M×N photodetector channels and generate a single output representing the energy and timing the gamma ray.

According to the disclosure, a method of PET imaging therefore includes receiving output signals from N summing circuits that are each electrically connected to a first surface and a respective row of M pixels in a pixelated scintillator array of M×N pixelated scintillators, receiving output signals from M summing circuits that are each electrically connected to the first surface and a respective column of N pixels in the pixelated array, and identifying which one of the rows has an increased signal as a result of a gamma ray interaction with one of the pixelated scintillators, based on the received output signals from the N summing circuits. The method further includes identifying which one of the columns has an increased signal as a result of the gamma ray interaction with the one of the pixelated scintillators, based on the received output signals from the M summing circuits, and determining which pixelated scintillator of the array had the gamma ray interaction based on the identified row and based on the identified column. The method also includes receiving output signals from N row sum circuits and generating a single output for energy and timing measurement.

Further, the method includes summing the output signals in each column of N pixels, and summing the output signals in each row of M pixels. The identified increased signals in the rows and columns are based on the summed output signals in the columns and rows. In addition, the method includes receiving output signals from an additional N summing circuits that are each electrically connected a second surface opposite the first surface and to a respective row of M pixels in the pixelated scintillator array, and receiving output signals from an additional M summing circuits that are each electrically connected to the first surface and to a respective column of N pixels in the pixelated array.

The method of imaging further includes determining the pixelated scintillator of the array that had the gamma ray interaction using summing circuits that are attached to a bottom surface of the pixelated array, and determining a depth of interaction of the gamma ray within the pixelated array using an amplitude of the summing circuits on the top surface and an amplitude of the summing circuits on the bottom surface. The method also includes receiving output signals from N summing circuits that are each electrically connected to the top surface and to a respective row of M pixels, receiving output signals from M summing circuits that are each electrically connected to the bottom surface and to a respective column of N pixels, identifying which one of the rows of N summing circuits has an increased signal as a result of the gamma ray interaction, based on the received output signals from the N summing circuits on the top surface, and identifying which one of the columns of M summing circuits has an increased signal as a result of the gamma ray interaction, based on the received output signals from the M summing circuits on the bottom surface. In addition, the method includes combining the output signals from the summing circuits on the top surface and the output signals from the summing circuits on the bottom surface and generating a single output for energy and timing measurement.

A PET detector may be fabricated accordingly, as well. In one example, a method of fabricating a PET detector includes providing an array of pixelated scintillators having a top surface and a bottom surface, the array including N rows of pixelated scintillators in a first direction and M columns of pixelated scintillators in a second direction that is approximately orthogonal with the first direction, attaching individual photosensors to each of the M×N pixelated scintillators on the top surface of the array, attaching N summing circuits to M photosensors on the top surface in each row of pixelated scintillators, attaching M summing circuits to N photosensors on the top surface in each column of pixelated scintillators, providing pulse shaping and dynamic switching circuits to receive outputs from the N summing circuits and generating a single energy and timing output signal, configuring a position encoding processor to receive outputs from the N+M summing circuits and programming the processor to determine which pixelated scintillator within the array had a gamma ray interaction based on the outputs.

In another example, a method of fabricating a PET detector includes providing an array of pixelated scintillators having a top surface and a bottom surface, the array including N rows of pixelated scintillators in a first direction and M columns of pixelated scintillators in a second direction that is approximately orthogonal with the first direction, attaching individual photosensors to each of the M×N pixelated scintillators on both the top and bottom surfaces of the array, attaching N summing circuits to photosensors on the top surface in each row of M pixelated scintillators, attaching M summing circuits to photosensors on the bottom surface in each column of N pixelated scintillators, providing pulse shaping and dynamic switching circuits to receive outputs from the N summing circuits and generate an energy and timing signal for the top surface readout, providing pulse shaping and dynamic switching circuits to receive outputs from the M summing circuits and generate an energy and timing signal for the bottom surface readout, configuring a position encoding processor to receive outputs from the N+M summing circuits and programming the processor to determine which pixelated scintillator within the array had a gamma ray interaction, as well as the depth of the interaction, based on the outputs.

An implementation of system 100 in an example comprises a plurality of components such as one or more of electronic components, hardware components, and/or computer software components. An exemplary component of an implementation of the system 100 employs and/or comprises a set and/or series of computer instructions written in or implemented with any of a number of programming languages, as will be appreciated by those skilled in the art.

An implementation of system 100 in an example employs one or more computer readable signal bearing media. A computer-readable signal-bearing medium in an example stores software, firmware and/or assembly language for performing one or more portions of one or more implementations. A computer-readable signal-bearing medium for an implementation of the system 100 in an example comprises one or more of a magnetic, electrical, optical, biological, and/or atomic data storage medium. For example, an implementation of the computer-readable signal-bearing medium comprises floppy disks, magnetic tapes, CD-ROMs, DVD-ROMs, hard disk drives, and/or electronic memory. In another example, an implementation of the computer-readable signal-bearing medium comprises a modulated carrier signal transmitted over a network comprising or coupled with an implementation of the system 100, for instance, an internal network, the Internet, a wireless network, and the like.

A technical contribution for the disclosed method and apparatus is that it provides for a computer-implemented method and apparatus of detecting outputs in a PET system from electrical circuits that sum outputs in both row and column directions, the computer programmed to determine which pixelated scintillator within the array had a gamma ray interact therewith based on the row and column summed outputs, and provide multiplexed readout of the summed outputs, the computer programmed to determine the energy and timing of the detected gamma ray based on the multiplexed output.

When introducing elements of various embodiments of the disclosed materials, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the preceding discussion is generally provided in the context of medical imaging, it should be appreciated that the present techniques are not limited to such medical contexts. The provision of examples and explanations in such a medical context is to facilitate explanation by providing instances of implementations and applications. The disclosed approaches may also be utilized in other contexts, such as the non-destructive inspection of manufactured parts or goods (i.e., quality control or quality review applications), and/or the non-invasive inspection or imaging techniques.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description, but is only limited by the scope of the appended claims.

What is claimed is:

1. A PET scanning system comprising:
a gantry having an opening for receiving a subject to be scanned;
a detector ring positioned to receive gamma rays that emit from the subject, the detector ring comprising a plurality of detector modules, each module comprising:
an array of M×N pixelated scintillators, the array comprised of N rows of pixelated scintillators and M columns of pixelated scintillators that are approximately orthogonal to the N rows, the array having an upper surface and a lower surface; and
individual photosensors attached to each pixelated scintillator on at least one of the upper and the lower surfaces;
N summing circuits that are each electrically connected to a respective row of M individual photosensors on one of the upper and lower surfaces;
M summing circuits that are each electrically connected to a respective column of N individual photosensors on one of the upper and lower surfaces;
a processor coupled to each of the summing circuits, the processor:
configured to receive outputs from the N+M summing circuits; and
configured to determine which pixelated scintillator within the array had a gamma ray interaction based on the outputs;
a pulse shaping circuit electrically coupled to outputs of each of the N and M summing circuits; and
a dynamic switching circuit coupled to an output of the pulse shaping circuit;
wherein the N summing circuits each sum signals from the M individual photosensors;
wherein the M summing circuits each sum signals from the N individual photosensors;
wherein the pulse shaping circuit shapes pulses received therein by processing through a band-pass filter; and
wherein the dynamic switching circuit includes a diode having an on-resistance that is inversely proportional to a driving signal strength, and reduces to a single output.

2. The PET system of claim 1, wherein:
each of the N summing circuits sums electrical signals from each row having the M individual photosensors; and
each of the M summing circuits sums electrical signals from each column having the N individual photosensors.

3. The PET system of claim 1, wherein, when the gamma ray interacts with the pixelated scintillator, one of the N summing circuits outputs a first increased signal and one of the M summing circuits outputs a second increased signal, and the processor is further configured to:
identify which row had the first output signal;
identify which column had the second output signal; and
correlate between the identified row and the identified column to determine which pixelated scintillator had the gamma ray interaction.

4. The PET system of claim 1, further comprising:
the individual photosensors attached to each pixelated scintillator on the upper and the lower surfaces;
the N summing circuits are each electrically connected to a respective row of M individual photosensors on the upper surface;

the M summing circuits are each electrically connected to a respective column of N individual photosensors on the lower surface that is opposite the upper surface; and the processor is:

configured to receive additional outputs from the additional N+M summing circuits; and configured to determine which pixelated scintillator within the array had the gamma ray interact therewith, and its depth of interaction, based on the additional outputs.

5. The PET system of claim 1, wherein M equals N.

6. The PET system of claim 5, wherein each module forms an approximate square.

7. The PET system of 1, wherein the photosensors each convert an optical signal, that results from the gamma ray interaction with the pixelated scintillator, to an electrical signal.

8. A method of PET imaging, comprising:

receiving output signals from N summing circuits that are each electrically connected to a first surface or a second surface and a respective row of M pixels in a pixelated scintillator array of M×N pixelated scintillators;

receiving output signals from M column summing circuits and from N row summing circuits in the pixelated array;

identifying which one of the rows has an increased signal as a result of a gamma ray interaction with one of the pixelated scintillators, based on the received output signals from the N row summing circuits;

identifying which one of the columns has an increased signal as a result of the gamma ray interaction with the one of the pixelated scintillators, based on the received output signals from the M column summing circuits;

determining which pixelated scintillator of the array had the gamma ray interaction based on the identified row and based on the identified column;

summing the output signals in each column of N pixels;

summing the output signals in each row of M pixels;

pulse shaping the signals from each of the summing steps; and reducing the pulse shaped signals to a single output using dynamic switching;

wherein the identified increased signals in the rows and columns are based on the summed output signals in the columns and rows.

9. The method of claim 8, further comprising:

receiving output signals from the N row summing circuits that are each electrically connected to the first surface; and receiving output signals from the M column summing circuits that are each electrically connected to the second surface.

10. The method of claim 8, further comprising determining a depth of interaction of the gamma ray within the pixelated array using an amplitude of the summing circuits on the top surface and an amplitude of the summing circuits on the bottom surface.

11. The method of claim 10, further comprising:

receiving output signals from N row summing circuits that are each electrically connected to the top surface and to a respective row of M pixels;

receiving output signals from M column summing circuits that are each electrically connected to the bottom surface and to a respective column of N pixels;

identifying which one of the rows of N row summing circuits has an increased signal as a result of the gamma ray interaction, based on the received output signals from the N summing circuits on the top surface; and identifying which one of the columns of M column summing circuits has an increased signal as a result of the gamma ray interaction, based on the received output signals from the M summing circuits on the bottom surface.

12. The method of claim 9, wherein M equals N.

13. A method of fabricating a PET detector, comprising:

providing an array of pixelated scintillators having a top surface and a bottom surface, the array including N rows of pixelated scintillators in a first direction and M columns of pixelated scintillators in a second direction that is approximately orthogonal with the first direction;

attaching individual photosensors to each of the M×N pixelated scintillators;

attaching N summing circuits to M photosensors in each row of pixelated scintillators;

attaching M summing circuits to N photosensors in each column of pixelated scintillators;

configuring a processor to receive outputs from the N+M row and column summing circuits;

configuring the processor to determine which pixelated scintillator within the array had a gamma ray interaction based on the outputs;

attaching individual photosensors to each of the M×N pixelated scintillators on the top and bottom surfaces;

attaching an additional N summing circuits on the top surface in each row of the pixelated scintillators;

attaching an additional M summing circuits on the bottom surface in each column of the pixelated scintillators;

configuring the processor to receive additional outputs from the additional N+M summing circuits; and configuring the processor to determine which pixelated scintillator within the array had the gamma ray interact therewith, and its depth of interaction, based on the additional outputs;

wherein the photosensors are silicon photomultipliers (SiPMs).

14. The method of claim 13, wherein:

configuring each of the N row summing circuits to sum electrical signals from each row; and configuring each of the M column summing circuits to sum electrical signals from each column.

15. The method of claim 13, wherein, when the gamma ray interacts with the pixelated scintillator, one of the N row summing circuits outputs a first increased signal and one of the M column summing circuits outputs a second increased signal, further comprising configuring the processor to:

identify which row had the first output signal;

identify which column had the second output signal; and correlate between the identified row and the identified column to determine which pixelated scintillator had the gamma ray interaction.

16. The method of claim 13, wherein M equals N, and wherein each module forms an approximate square.

17. The method of claim 13, further comprising:

electrically coupling a pulse shaping circuit to outputs of each of the N and M summing circuits; and electrically coupling a dynamic switching circuit to an output of the pulse shaping circuit;

wherein the N summing circuits each sum signals from the M individual photosensors;

wherein the M summing circuits each sum signals from the N individual photosensors;

wherein the pulse shaping circuit shapes pulses received therein by processing through a band-pass filter; and wherein the dynamic switching circuit includes a diode having an on-resistance that is inversely proportional to a driving signal strength, and reduces to a single output.

18. A PET scanning system comprising:

a gantry having an opening for receiving a subject to be scanned;

a detector ring positioned to receive gamma rays that emit from the subject, the detector ring comprising a plurality of detector modules, each module comprising:

an array of M×N pixelated scintillators, the array comprised of N rows of pixelated scintillators and M columns of pixelated scintillators that are approximately orthogonal to the N rows, the array having an upper surface and a lower surface; and individual photosensors attached to each pixelated scintillator on at least one of the upper and the lower surfaces;

N summing circuits that are each electrically connected to a respective row of M individual photosensors on one of the upper and lower surfaces;

M summing circuits that are each electrically connected to a respective column of N individual photosensors on one of the upper and lower surfaces;

the individual photosensors attached to each pixelated scintillator on the upper and the lower surfaces;

the N summing circuits are each electrically connected to a respective row of M individual photosensors on the upper surface;

the M summing circuits are each electrically connected to a respective column of N individual photosensors on the lower surface that is opposite the upper surface; and a processor coupled to each of the summing circuits, the processor:

configured to receive outputs from the N+M summing circuits;

configured to determine which pixelated scintillator within the array had a gamma ray interaction based on the outputs;

configured to receive additional outputs from the additional N+M summing circuits; and configured to determine which pixelated scintillator within the array had the gamma ray interact therewith, and its depth of interaction, based on the additional outputs.

19. A method of PET imaging, comprising:

receiving output signals from N summing circuits that are each electrically connected to a first surface or a second surface and a respective row of M pixels in a pixelated scintillator array of M×N pixelated scintillators;

receiving output signals from M column summing circuits and from N row summing circuits in the pixelated array;

identifying which one of the rows has an increased signal as a result of a gamma ray interaction with one of the pixelated scintillators, based on the received output signals from the N row summing circuits;

identifying which one of the columns has an increased signal as a result of the gamma ray interaction with the one of the pixelated scintillators, based on the received output signals from the M column summing circuits;

determining which pixelated scintillator of the array had the gamma ray interaction based on the identified row and based on the identified column;

receiving output signals from the N row summing circuits that are each electrically connected to the first surface; and receiving output signals from the M column summing circuits that are each electrically connected to the second surface.

20. A method of PET imaging, comprising:

receiving output signals from N summing circuits that are each electrically connected to a first surface or a second surface and a respective row of M pixels in a pixelated scintillator array of M×N pixelated scintillators;

receiving output signals from M column summing circuits and from N row summing circuits in the pixelated array;

identifying which one of the rows has an increased signal as a result of a gamma ray interaction with one of the pixelated scintillators, based on the received output signals from the N row summing circuits;

identifying which one of the columns has an increased signal as a result of the gamma ray interaction with the one of the pixelated scintillators, based on the received output signals from the M column summing circuits;

determining which pixelated scintillator of the array had the gamma ray interaction based on the identified row and based on the identified column; and determining a depth of interaction of the gamma ray within the pixelated array using an amplitude of the summing circuits on the top surface and an amplitude of the summing circuits on the bottom surface.

21. A method of fabricating a PET detector, comprising:

providing an array of pixelated scintillators having a top surface and a bottom surface, the array including N rows of pixelated scintillators in a first direction and M columns of pixelated scintillators in a second direction that is approximately orthogonal with the first direction;

attaching individual photosensors to each of the M×N pixelated scintillators;

attaching N summing circuits to M photosensors in each row of pixelated scintillators;

attaching M summing circuits to N photosensors in each column of pixelated scintillators;

configuring a processor to receive outputs from the N+M row and column summing circuits;

configuring the processor to determine which pixelated scintillator within the array had a gamma ray interaction based on the outputs;

electrically coupling a pulse shaping circuit to outputs of each of the N and M summing circuits; and electrically coupling a dynamic switching circuit to an output of the pulse shaping circuit;

wherein the N summing circuits each sum signals from the M individual photosensors;

wherein the M summing circuits each sum signals from the N individual photosensors;

wherein the pulse shaping circuit shapes pulses received therein by processing through a band-pass filter; and wherein the dynamic switching circuit includes a diode having an on-resistance that is inversely proportional to a driving signal strength, and reduces to a single output.

* * * * *